May 30, 1944.     E. AULIN     2,350,210
ARRANGEMENT IN DISTANCE-METERS ACCORDING TO THE STEREO-PRINCIPLE
Filed March 14, 1942
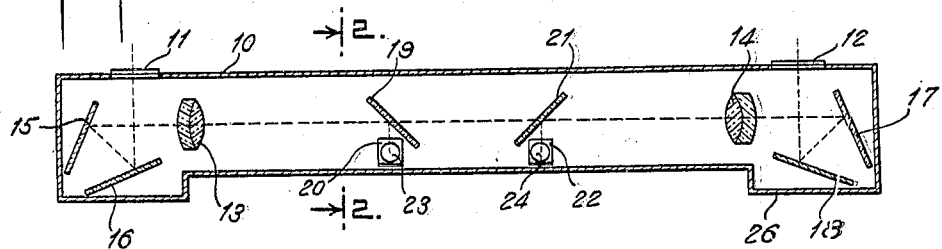
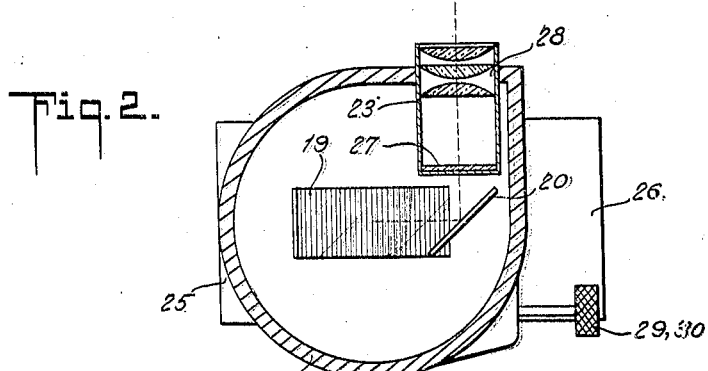
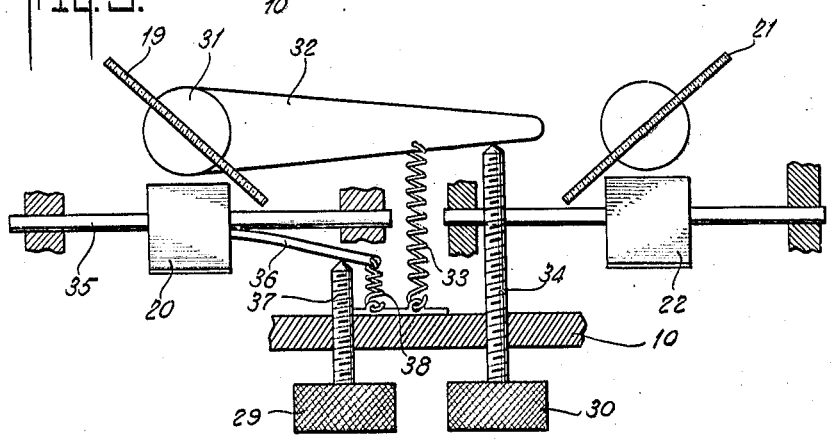
INVENTOR.
Evert Aulin
BY
His ATTORNEY Patented May 30, 1944

2,350,210

UNITED STATES PATENT OFFICE 2,350,210

ARRANGEMENT IN DISTANCE METERS ACCORDING TO THE STEREO-PRINCIPLE

Evert Aulin, Lidingo, Sweden, assignor to Aga-Baltic Aktiebolag, Stockholm, Sweden, a corporation of Sweden Application March 14, 1942, Serial No. 434,715
In Sweden March 19, 1941

2 Claims. (Cl. 88—2.7)

My invention relates to an arrangement in distance-meters according to the stereo-principle.

Distance-meters according to the stereo-principle as is well known, have two telescopes each containing a scale, provided in the optical parts of the telescopes, and usually made on a transparent glass contained in the optical part. These scales, however, are in such a way systematically different, that they create for the eye a stereoscopic picture of a scale, which appears to extend outwards in space from the observer. The telescopes normally are adjusted for sharpness in infinite distance, and as the distances to be measured are as a rule sufficiently great, a distance adjustment of the telescopes will as a rule not be required. When measuring a distance the meter is displaced horizontally or vertically, until the scale appears to touch the object, the distance of which is to be measured. The scale is graduated in such a way that the point at which the scale touches the object, also indicates the distance to the object.

Experience has proved, however, that distance-meters according to the stereo-principle are subject to systematic as well as accidental errors, the former ones among other things emanating due to the dimensional changes of different parts under influence of temperature variations, and the latter ones among other things caused by displacements in the relative positions of parts, connected to each other, said displacements usually even not being observable with the eye, and for instance caused during transport. To make it possible that the instrument rapidly may be adjusted, they have been provided with separate adjustment means.

The errors, adjusted for by means of the adjustment means, may contain a displacement of one of the pictures with respect to the other in practically every direction. Due to this there has been provided as adjustment means in the path of rays from one or both of the objectives a turnably mounted wedge of glass, which could be turned into a direction, corresponding to the displacement of the picture. The error, however, is not only determined by its direction but also by its magnitude, and by means of the said arrangement adjustment in both of these respects was not possible. One has usually, therefore, had to be satisfied with such an adjustment that no error in horizontal direction was present, as such an error would cause an incorrect indication of the distance. However, an error in vertical direction would thus remain, which could not be compensated for by means of the adjustment means.

The adjustment was made in such a way that the distance-meter instrument was directed at an object, situated at a great distance, and the adjustment screw turned in such a way that the object would form a picture with sharpness at the infinite mark on the distance scale. A possibly remaining error in vertical direction was thereafter, if desired, removed by inclining the optical axis of one part of the instrument sidewards. Hereby one of the picture fields would move upwards and the other one downwards. This manner of compensating for the error in vertical direction, however, requires a very complicated mechanical construction.

The present invention is based on the principle, that the error should be divided according to the coordinate-system in one error in horizontal direction, which also may be named the distance error, as it does alone determine possible wrong indication of the distance, and in one error in vertical direction, said errors being separately adjustable in such a way that without any change of the direction of the instrument itself, full compensation of both errors will be obtained. Preferably the adjustment means are arranged in such a way that one of them only affects the horizontal error or distance error, but leaves the error in vertical direction unaffected, whereas the other one only affects the error in vertical direction but leaves the error in horizontal direction unaffected.

According to the invention between the objective and the ocular lenses, two mirrors are arranged in the path of rays through the instrument, said mirrors being turnably arranged about shafts, which form an angle with another, or possibly by deflection means are brought to act as if they formed an angle with each other, one of the mirrors acting for sideway correction and the other mirror acting for vertical correction.

The arrangement is below described in connection with the annexed drawing, in which Fig. 1 shows principally a distance-meter instrument according to the invention, whereas Fig. 2 and Fig. 3 show details of an arrangement according to the invention.

In Fig. 1 10 is the case around the instrument. In this there are two openings, covered by protection glasses 11 and 12, for the incoming rays of light, which are reflected to the respective objective lenses 13 and 14 by means of mirrors 15 and 16 and also 17 and 18, respectively. Each of the objective lenses, which is seen in section, is assumed to contain one biconvex lens and one concave-convex lens. After having passed through the objective lenses the rays of light are again reflected by two pairs of mirrors 19 and 20 and also 21 and 22, respectively, to the ocular lenses 23 and 24, respectively. The adjustment means are not shown in this figure.

Fig. 2 shows the objective arrangement seen in the direction of the section 2—2 in Fig. 1. The case is as above indicated 10. 25 is the fastening for the protection glass 12 and 26 is the projection containing the mirror 18. The rays of light are in Fig. 2 falling perpendicular to the plane of the paper onto the mirror 19. They are reflected by this mirror onto the mirror 20 and are thereafter reflected upwards through a glass 27 provided in the ocular, on which the scale is arranged, and finally through the ocular lenses 28. For turning the mirrors 19 and 20 in order to obtain the desired adjustment, two knobs 29, 30 are arranged, one of which is in Fig. 2 directly behind the other one.

Fig. 3 shows further how the knobs adjust the mirrors. The mirror 19 is arranged on a turnable shaft 31, which also carries an arm 32. This arm is biased in clockwise direction by the spring 33, but is by means of the screw 34 prevented from moving in said direction, the head of said screw being formed as a knob 30. In a corresponding way the mirror 20 is turnably arranged about the shaft 35. An arm 36 is connected to the mirror, said arm in its outer part being formed as a plate, cooperating with the end of the screw 37. The arm 36 is biased against the screw 37 by means of the spring 38.

The function of the arrangement will immediately be clear from the foregoing description. Turning of the mirror 20 by means of the screw 37—29 will cause a displacement of the picture in vertical direction, whereas the picture is displaced in horizontal direction, when the screw 34—30 turns the mirror 19.

In the form of the invention illustrated only one of the side deflection mirrors and one of the vertical deflection mirrors has been shown as adjustable. However, it is of course possible to arrange both of the mirrors of each kind in a similar adjustable manner. It is also possible to arrange the vertical deflection mirror belonging to one of the systems, for instance the left one, as well as the horizontal deflection mirror, belonging to the other system, for instance the right one, adjustable. Other modifications may also be made without departing from the invention.

What is claimed:

1. In a stereoscopic range finder, an objective lens, an ocular lens, a pair of members having reflecting surfaces disposed in the path of light rays between said lenses, said surfaces being inclined with respect to each other, means for adjusting the inclination of one surface with respect to the other about a single axis only, and means for adjusting the inclination of the other surface with respect to said one surface about a single axis only, said axes being disposed at an angle to each other.

2. In a stereoscopic range finder, an objective lens, an ocular lens, a pair of reflecting mirrors disposed in the path of light rays between said lenses, a pair of turnable shafts disposed at right angles to each other, one of said mirrors being mounted on each of said shafts, and means for turning said shafts independently of each other whereby the inclination of one mirror with respect to the other may be varied about only the axis of the shaft on which said one mirror is mounted and the inclination of the other mirror with respect to said one mirror may be varied about only the axis of the shaft on which said other mirror is mounted.

EVERT AULIN.